Sept. 24, 1929.  C. H. DRAPER  1,729,598
VISUAL STOP INDICATOR
Filed Dec. 8, 1928
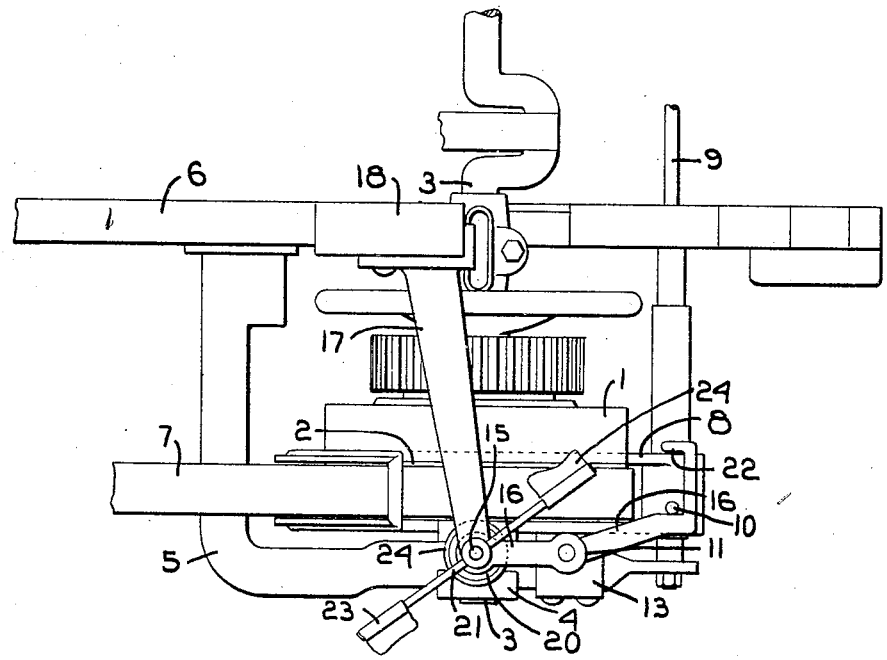
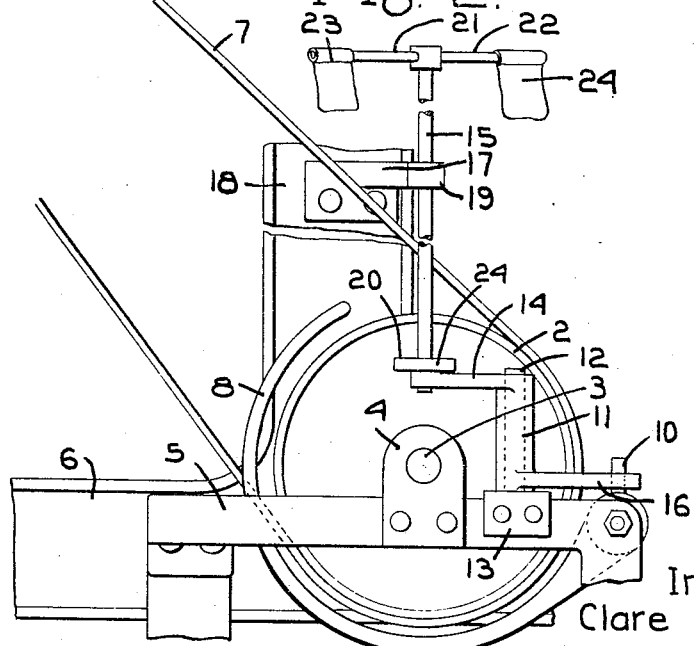
Inventor.
Clare H. Draper
by Heard Smith & Tennant
Attys.

Patented Sept. 24, 1929

1,729,598

UNITED STATES PATENT OFFICE

CLARE H. DRAPER, OF HOPEDALE, MASSACHUSETTS, ASSIGNOR TO DRAPER CORPORATION, OF HOPEDALE, MASSACHUSETTS, A CORPORATION OF MAINE

VISUAL STOP INDICATOR

Application filed December 8, 1928. Serial No. 324,772.

This invention relates to visual stop indicating devices for machines and has for its general object to provide a device which will be readily observed and which will attract the attention of an operator even though he is in a remote part of the room.

A further object of the invention is to provide a stop indicator which is kept continuously in motion while the machine is stopped and which is stopped when the machine is started.

A further object of the invention is to provide a stop indicator which is directly connected to and operates from a starting and stopping mechanism thus being positive in its action.

A further object of the invention is to provide a stop indicator which may be readily attached to existing apparatus.

A further object of the invention is to provide a stop indicator which has a rotating telltale driven from the same source of power as that which drives the machine.

Other objects and features will appear more fully from the following description in connection with the accompanying drawings and will be particularly pointed out in the claims.

In the drawings:

Fig. 1 is a partial plan view of a loom having a stop indicator of the character herein described.

Fig. 2 is a partial end elevation of the loom.

The invention resides in stop indicating devices as applied to any type of machine. It is essential that an operator should know as soon as possible that a machine has stopped in order to prevent the lapse of valuable time while the machine is idle. The present invention is designed to produce a very conspicuous signal which is not easily overlooked even in cases where an operator must attend a large number of machines and may be in a remote part of the room.

In general the device consists of a telltale mounted for rotation upon a vertical shaft. The shaft is driven by a wheel mounted rigidly thereon having frictional engagement with a loose pulley which runs continuously when the machine is stopped. Such engagement being controlled automatically by the belt shipper which starts and stops the machine. The device may be adapted to suit various types of machines and to various methods of driving, starting and stopping them without departing from the scope of the following claims.

An adaptation suitable for a loom is herein illustrated in order to more accurately and completely describe the invention. The particular method of driving the loom herein shown is by means of the well known tight and loose pulley arrangement. The tight and loose pulleys 1 and 2 are mounted on the drive shaft 3 the outer end of which is supported in a bearing 4 on a bracket 5 fixed rigidly to the loom side 6. In the position of the parts illustrated the driving belt 7 is shown upon the loose pulley 2 thus causing the loom to remain idle. If it is desired to start the loom the belt 8 is moved into such position that it will cause the belt to drive the tight pulley 1 which will start the machine.

The belt shipper 8 is actuated by a starting rod 9 which is connected to the starting lever of the loom which is not shown. The belt shipper 8 has an upstanding stud 10 which moves therewith and which engages one end of a lever 11 which is fulcrumed at 12 upon a block 13 mounted on the bracket 5. One arm 14 of the lever 11 has journalled therein one end of a vertical telltale shaft 15 while the other arm 16 of the lever extends into the path of the stud 10. The telltale shaft 15 is held in position by a bracket 17 fixed to some convenient part of the loom such as a portion 18 of the arch. The bracket 17 has a rather loosely fitting journal 19 in the outer end thereof so as to permit slight axial displacement of the shaft. The lower end of the shaft 15 has mounted thereon a wheel 20 whose periphery is adjacent to the outer face of the loose pulley 2. On the upper end of the shaft 15 is mounted the telltale 21 which has a cross bar 22 upon either end of which is mounted a signal which may be of any character calculated to attract attention when the shaft is rotated. As herein shown they are in the form of flags 23 and 24 which wave and vibrate as they move. Normally while the machine is running the telltale is motionless. In this condition the stud 10 will bear against the tail 22 on the arm 16 of the lever 11 thus holding the wheel 20 out of engagement with the loose pulley 2. If however the machine is stopped the motion of the belt shipper will bring the stud 10 into engagement with the arm 16 of the lever 11 which will cause the wheel 20 to engage the loose pulley and thus rotate the telltale.

The wheel 20 may be provided with a rim of flexible rubber or similar material in order to provide a certain amount of resiliency to the contact between the wheel and the pulley. A further advantage of such construction is that it provides a better frictional contact and consequently a more positive drive for the telltale.

Having thus described the invention, what is claimed as new, and desired to be secured by Letters Patent, is:

1. The combination of a machine, a normally quiescent visual stop indicator therefor and means acting to set the indicator in continuous motion when the machine is stopped.

2. The combination of a machine, a normally quiescent visual stop indicator therefor and means acting to set the indicator in continuous rotary motion when the machine is stopped.

3. The combination of a machine, a continuously moving driving means therefor, a normally quiescent visual stop indicator, means acting to cause said driving means to set the indicator in continuous rotary motion when the machine is stopped.

4. The combination of a machine, a normally quiescent visual stop indicator therefor, an element moving continuously when the machine is stopped and means acting to cause said element to set the indicator in continuous motion when the machine is stopped.

5. The combination of a machine, means to drive the machine, means to stop the machine by disengagement thereof from said driving means, a normally quiescent visual stop indicator, means to rotate said indicator and means connected to said stopping means and acting to set the indicator in continuous motion by causing said rotating means to engage said driving means when the machine is stopped.

6. The combination of a machine, a visual stop indicator therefor comprising a shaft, a telltale set in continuous motion by the rotation of the shaft and a driving wheel on the shaft, an element on the machine continuously rotated when the machine is stopped and means for effecting a driving engagement of said wheel from said element when the machine is stopped and disengagement thereof when the machine is running.

7. The combination of a loom, a starting and stopping mechanism comprising a tight and loose pulley upon the driving shaft, a belt to transmit power to said pulleys and a belt shipper, a normally quiescent visual stop indicator therefor comprising a shaft, a telltale mounted upon the shaft, a driving wheel on the shaft, and means connected with said belt shipper to effect a continuous driving engagement of said wheel from said loose pulley when the machine is stopped and disengagement thereof when the machine is running.

In testimony whereof, I have signed my name to this specification.

CLARE H. DRAPER.